United States Patent [19]

Coirier et al.

[11] Patent Number: 5,675,327
[45] Date of Patent: Oct. 7, 1997

[54] OPTOELECTRONIC DEVICE FOR ASSISTANCE IN THE PILOTING OF AN AIRCRAFT

[75] Inventors: Philippe Coirier, Merignac; Alain Goujon, Martignas sur Jalle, both of France

[73] Assignee: Sextant Avionique, Meudon La Foret, France

[21] Appl. No.: 538,646

[22] Filed: Oct. 4, 1995

[30] Foreign Application Priority Data

Oct. 18, 1994 [FR] France .................. 94 12409

[51] Int. Cl.$^6$ ............................................. G01C 23/00
[52] U.S. Cl. ...................... 340/973; 340/971; 340/980; 364/424.06; 364/428; 244/181; 73/178 T; 73/178 R
[58] Field of Search ............................. 340/975, 976, 340/974, 971, 973, 978, 979, 980; 364/424.06, 428; 244/181; 73/178 R, 178 T

[56] References Cited

U.S. PATENT DOCUMENTS

| | | | |
|---|---|---|---|
| 3,648,232 | 3/1972 | White | 340/971 |
| 3,776,455 | 12/1973 | Gee | 364/429 |
| 3,824,535 | 7/1974 | Rover, Jr. | 340/975 |
| 4,247,843 | 1/1981 | Miller et al. | 340/973 |
| 4,283,705 | 8/1981 | James et al. | 340/976 |
| 4,454,496 | 6/1984 | Lowe | 340/980 |
| 4,860,007 | 8/1989 | Konicke et al. | 340/973 |
| 4,999,780 | 3/1991 | Mitchell | 364/428 |
| 5,003,305 | 3/1991 | Kelly et al. | 340/974 |
| 5,016,177 | 5/1991 | Lambregts | 364/424.06 |
| 5,248,968 | 9/1993 | Kelly et al. | 340/961 |
| 5,250,947 | 10/1993 | Worden et al. | 340/973 |
| 5,289,185 | 2/1994 | Ramier et al. | 340/971 |
| 5,359,890 | 11/1994 | Fulton et al. | 73/178 R |
| 5,412,382 | 5/1995 | Leard et al. | 340/974 |

FOREIGN PATENT DOCUMENTS

| | | |
|---|---|---|
| 0 044 777 | 1/1982 | European Pat. Off. . |
| 0 545 473 A3 | 6/1993 | European Pat. Off. . |
| 2 004 828 | 4/1979 | United Kingdom . |

Primary Examiner—Jeffery Hofsass
Assistant Examiner—Benjamin C. Lee
Attorney, Agent, or Firm—Oblon, Spivak, McClelland, Maier & Neustadt, P.C.

[57] ABSTRACT

The disclosed optoelectronic device is designed to facilitate the piloting of an aircraft under conditions of poor visibility, notably during landing at the stage when the aircraft approaches a runway. It consists of a collimator which displays, in addition to the artificial skyline, miniature aircraft index and attitude bars, a slope scale positioned across and on either side of the artificial skyline, at the position of the selected course chosen by the pilot. This slope scale, depicted in the form of a line of dots spaced out at one slope degree, enables the pilot to be presented simultaneously with information on selected course and slope and enables the determining of pitch attitude with high precision.

5 Claims, 2 Drawing Sheets

OPTOELECTRONIC DEVICE FOR ASSISTANCE IN THE PILOTING OF AN AIRCRAFT

BACKGROUND OF THE DESCRIPTION

1. Field of the Invention

The present invention relates to optoelectronic devices for assistance in the piloting of aircraft under conditions of poor visibility, notably during landing at the final approach stage and during takeoff.

2. Description of the Prior Art

Optoelectronic devices for assistance in the piloting of an aircraft or helicopter consist of collimators or head-up visors showing graphic and alphanumerical information before the eyes of the pilot. The information is presented in the form of reticules projected on a semi-reflective, optical system superimposed on the view of the outside world.

The performance characteristics obtained with these optoelectronic devices for assistance in piloting depend directly on the characteristics of the various reticules shown to the pilot, in terms of both capacity for comprehensive monitoring of the situation and precision of maneuvers performed manually.

The reticules usually displayed may be classified in different groups according to the indications that they give:

information from the "basic Tee" of the instrument panel (pertaining to speed, attitude, heading, altitude), information close to that provided by the "basic Tee" (pertaining to Mach number, rate of climb given by the rate-of-climb indicator, altitude given by the radio altimeter), information related to the trajectory (speed vector, acceleration, total slope), zone radio-navigation information (RNAV) enabling a course to be followed by means of radioelectrical beacons (using the VOR, ILS and DME systems), complementary situation control information (explicit instructions pertaining to course, heading, etc., deviation from set values (speed, etc.), indications of operating methods, various alarms, etc.).

In the field of civil aviation, collimators are used chiefly for the stages of landing, taxiing and take-off in conditions of poor visibility. They enable a reduction of the minimum operational levels of visibility and increase the safety of operations through an enhanced capacity to monitor the situation. They furthermore provide greater precision of control of the trajectory when flying by sight.

In the presently known methods, distinct forms of representation of graphic data are used either to inform the pilot of the set course and set slope or to provide him with a means of assessing the state of his trajectory with respect to these set values. Furthermore, the scales enabling the assessment of slope or attitude, called attitude bars, have low resolution, typically in the range of five or even ten degrees. Finally, the controlling and holding of a precise trajectory in conditions of wind and engine failure remains difficult with these forms of representation.

SUMMARY OF THE INVENTION

The present invention is aimed at improving the performance characteristics of a collimator used in the stages of approach, landing and initial climbing at take-off as well as in wave-off or overshoot procedures, by means of a novel concept of the representing of the information presented that makes it possible to increase the level of monitoring of the situation in general and the precision with which the trajectory is followed in particular.

An object of the invention is an optoelectronic device for assistance in the piloting of an aircraft that is provided with a navigation system determining, inter alia, the direction, the pitch attitude and the roll attitude as well as the ground speed vector of the aircraft, and with a collimator displaying an artificial skyline graduated with a heading scale that gives a zero attitude and slope reference, a reticule identifying the ground speed vector and a fixed reticule formed by a miniature aircraft index, surrounded by attitude bars identifying the pitch attitude and roll attitude of the aircraft with respect to the artificial skyline. This device is noteworthy in that it comprises means for the display, on the collimator, of a slope scale positioned across and on either side of the artificial skyline, at the position of the selected course chosen by the pilot.

This slope scale positioned on the artificial skyline, at the position of the selected route, enables the simultaneous presentation, to the pilot, of information on selected course, slope and pitch attitude with high precision.

This slope scale positioned on the artificial skyline, at the position of the course selected by the pilot, is advantageously represented by a line of dots with a spacing of one slope degree between them, the dots at every fifth degree being bigger than the ordinary dots to make it easier to read to the scale.

BRIEF DESCRIPTION OF THE DRAWINGS

Other features and advantages of the invention shall appear from the following description of an embodiment given by way of an example. This description will be made with reference to the drawings, of which.

MORE DETAILED DESCRIPTION

Figure 1:
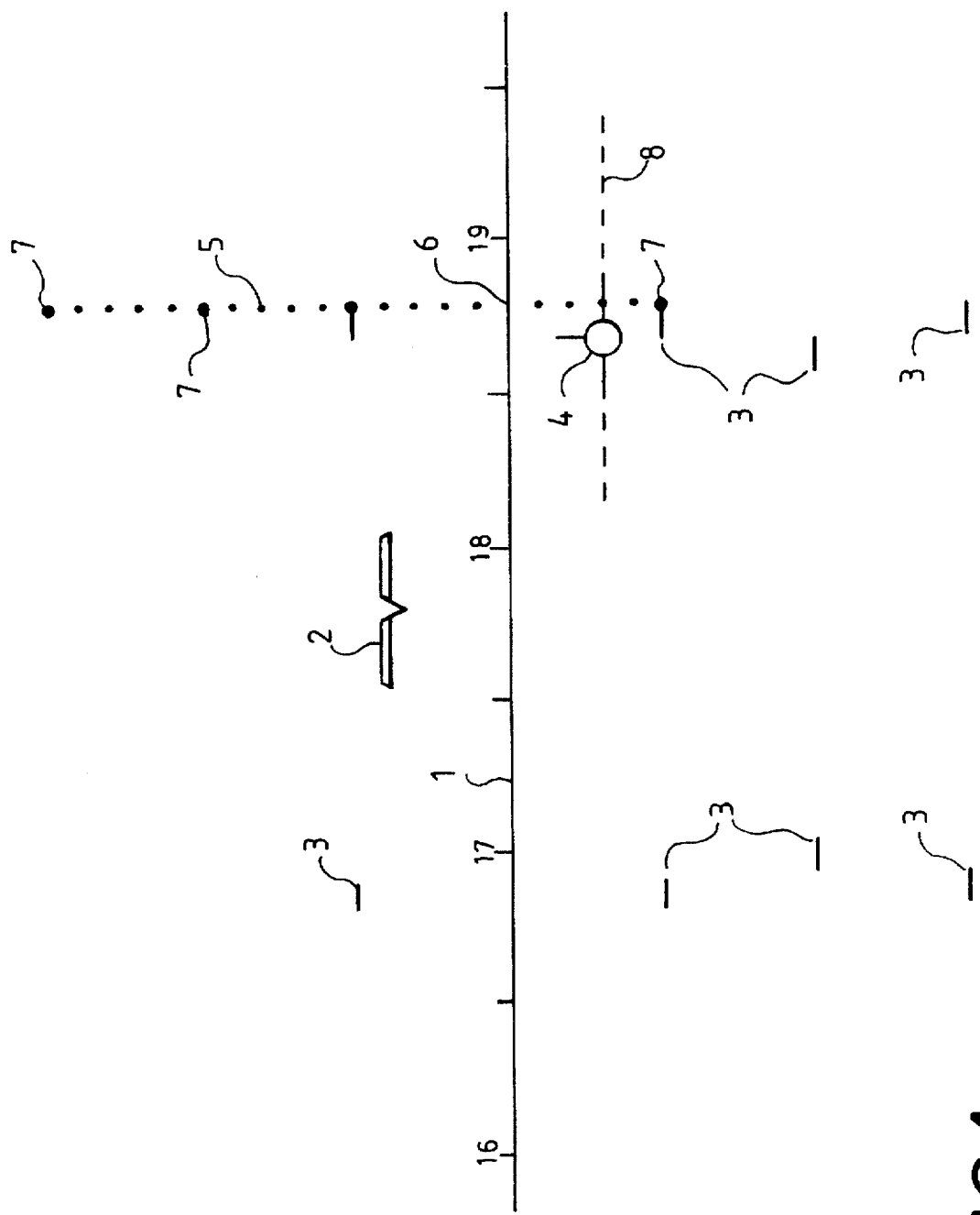
FIG. 1 is a drawing that illustrates the reticules displayed on a collimator relating to the monitoring of the trajectory and attitude of an aircraft with, among others, the reticule displayed on the device according to the invention.

A collimator takes the form of a transparent screen through which the pilot looks at the exterior. On this transparent screen, various reticules are drawn in order to facilitate the piloting task. FIG. 1 more particularly shows the reticules that enable the monitoring of the course and attitudes of the aircraft and of the slope of the trajectory. The figure shows a reticule plotting a horizontal line 1 graduated with a heading scale. This horizontal line 1 is the artificial skyline. It moves according to information provided by the navigation system. A miniature aircraft index 2, placed on the longitudinal reference of the aircraft in the plane of symmetry of the fuselage, makes it possible, in liaison with the artificial skyline which is itself surrounded by reference marks 3 called attitude bars, to assess the heading of the aircraft and have an approximate view of the pitch attitude and roll attitude of the aircraft. Another reticule 4, in the form of a small mobile winged circle, represents the orientation of the ground speed vector in terms of course and slope.

In addition to these standard reticules, there is a line of dots 5, plotted perpendicularly to the artificial skyline 1 at the heading 6 of the course selected by the pilot. This line of dots 5 is a slope scale. Its dots, typically 20 above and 5 below the artificial skyline, are spaced out by one slope degree. The dots 7 at every fifth degree are double-sized in order to facilitate reading along the scale. The number of dots above the horizon reference represents the maximum permissible pitch attitude of the aircraft at wave-off or take-off.

The slope of the aircraft trajectory will be assessed by observing the position of the reticule 4 identifying the ground speed vector with reference to the slope scale of the line of dots 5.

The pitch attitude of the aircraft will be assessed by observing the position of the reticule of the fixed miniature aircraft 2 with respect to the slope scale of the line of dots 5.

This line of dots 5, graduated in a slope scale and placed at the heading of the route selected by the pilot, makes it easier for the pilot to carry out the monitoring and checking, simultaneously in the horizontal plane and in the vertical plane, of the following parameters, and to do so with high precision in all the usual conditions of flying and even in conditions of cross-wind or engine failure:

current slope or relative divergence between the current slope and a set slope divergence of heading between the current route and the selected route, pitch attitude.

During a final stage of approaching a runway, when there is not wind and before touchdown, the reticule symbolizing the ground speed vector 4 and the reticule symbolizing the fixed miniature aircraft 2 are in the neighborhood of the slope scale formed by the line of dots 5. This facilitates the simultaneous use of these reticules for the monitoring of the situation. Indeed, under these circumstances, the reticule symbolizing the ground speed vector 4 and the reticule symbolizing the fixed miniature aircraft 2 approach the set trajectory which is in the vertical plane passing through the heading that corresponds to the selected course and is substantially identical to the heading of the runway.

During the final flare-out at landing for touchdown, the slope scale formed by the line of dots 5 also makes it possible, through its resolution to the nearest degree of its graduation, to improve the monitoring of the maneuver by the easy checking of the rise of the reticule symbolizing the ground speed vector to the horizon reference along the scale of dots.

FIG. 1 depicts an operational situation. The fixed miniature aircraft 2 and the ground speed vector 4 are offset by an angle representing the drift due to the cross-wind. By checking the situation with a reticule symbolizing a slope scale by a line of dots 5 positioned at the heading of the selected course, it can be stated that the aircraft is flying:

at about one degree to the left of the set course, at the set slope of minus three degrees given by a slope reference 8, and at a pitch attitude of about plus four degrees.

There may be different variants for the shape of the reticule displaying the slope scale at the heading of the selected course. The line of dots may be replaced by another graphic depiction. It may be complemented, as shown, by an explicit depiction of the set slope. The range of representation of the scale may be wider. The set course may be replaced by a set heading.

Figure 2:
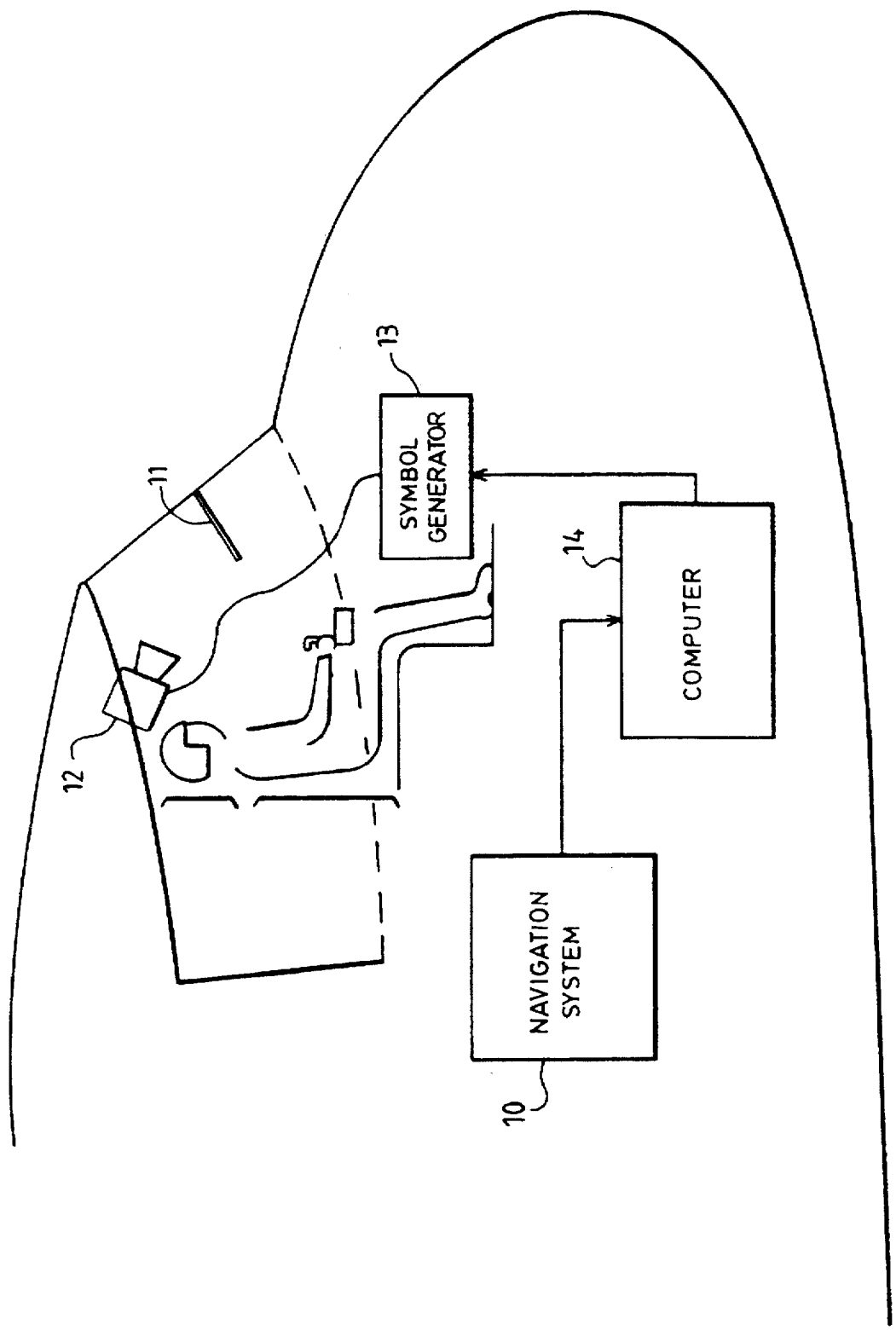
FIG. 2 is a drawing that illustrates the general architecture of a device according to the invention on board an aircraft.

FIG. 2 illustrates the general architecture of a piece of equipment installed on board an aircraft for the display, before a pilot's eyes, of this reticule symbolizing a slope scale positioned at the heading of the selected course. The aircraft, of which it is possible to see the front part with the cockpit, is fitted out with a navigation system 10 and a collimator 11.

The navigation system 10 gives the usual indications including, notably, the heading, the ground speed vector, the pitch attitude and the roll attitude.

The collimator includes a transparent screen 11 placed before the pilot's eyes, superimposed over the outside scene. On this screen, a projection device 12 displays different reticules pertaining to piloting, including those shown in FIG. 1.

The projection device 12 is controlled by a symbol generator 13 which receives updating commands from a computer 14 with programmed logic, connected to the navigation system 10.

What is claimed is:

1. An optoelectronic device for assistance in the piloting of an aircraft that is provided with a navigation system determining, inter alia, the heading, the pitch attitude and the roll attitude as well as the ground speed vector of the aircraft, and with a collimator for displaying an artificial skyline graduated with a heading scale and surrounded by attitude bars giving a zero roll attitude and slope reference, a reticule identifying the ground speed vector and a fixed reticule formed by a miniature aircraft index identifying the heading and the pitch and roll attitudes of the aircraft with respect to the artificial skyline, wherein said device comprises means for the display, on the collimator, of a slope scale positioned across and on either side of the artificial skyline, at the position of the selected course chosen by the pilot; wherein the ground speed vector reticule visually identifies orientation of the ground speed vector in terms of course and slope relative to the slope scale which also identifies the selected course.

2. A device according to claim 1, wherein said slope scale is perpendicular to the artificial skyline.

3. A device according to claim 1, wherein said means to display a slope scale at the location of the heading of the selected course displays a line of dots across and on either side of the artificial skyline.

4. A device according to claim 3, wherein the dots of said line of dots are evenly spaced out at a graduation pitch smaller than one slope degree.

5. A device according to claim 3, wherein the dots of said line of dots are evenly spaced out at a pitch of one slope degree and wherein the dots at every fifth slope degree have a size greater than that of the remaining dots to facilitate the ease of reading of the scale.

* * * * *